(12) United States Patent
Bonk et al.

(10) Patent No.: US 12,128,800 B2
(45) Date of Patent: Oct. 29, 2024

(54) VEHICLE AND OCCUPANT SUPPORT FOR A VEHICLE

(71) Applicant: Faurecia Automotive Seating, LLC, Auburn Hills, MI (US)

(72) Inventors: Jeffery T. Bonk, Chesterfield, MI (US); Robert C. Fitzpatrick, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 325 days.

(21) Appl. No.: 17/582,389

(22) Filed: Jan. 24, 2022

(65) Prior Publication Data

US 2023/0234482 A1   Jul. 27, 2023

(51) Int. Cl.
*B60N 2/04* (2006.01)
*B60N 2/30* (2006.01)
*B60N 3/00* (2006.01)

(52) U.S. Cl.
CPC .......... *B60N 2/309* (2013.01); *B60N 2/3031* (2013.01); *B60N 2/3065* (2013.01)

(58) Field of Classification Search
CPC .... B60N 2/309; B60N 2/3011; B60N 2/3013; B60N 2/3031; B60N 2/3065; B60N 2002/363; B60N 2002/32; B60N 2002/36
USPC .......... 296/65.05, 9, 16; 297/16.1, 2, 34, 46, 297/47, 344.1, 12, 13, 14, 15, 17, 378.1
See application file for complete search history.

(56) References Cited

U.S. PATENT DOCUMENTS

| | | | |
|---|---|---|---|
| 5,195,795 A * | 3/1993 | Cannera | B60N 2/309 296/65.09 |
| 5,588,707 A | 12/1996 | Bolsworth | |
| 6,113,191 A | 9/2000 | Seibold | |
| 6,234,553 B1 * | 5/2001 | Eschelbach | B60N 2/3011 296/65.09 |
| 6,648,395 B2 * | 11/2003 | Hoshino | B60N 2/3011 297/378.12 |
| 6,817,646 B2 * | 11/2004 | Kikuchi | B60N 2/06 296/65.09 |
| 7,568,764 B2 * | 8/2009 | Harper | B60N 2/3011 297/14 |
| 7,611,200 B2 | 11/2009 | Jovicevic | |
| 8,579,374 B2 * | 11/2013 | Epaud | B60N 2/309 297/378.12 |
| 8,899,684 B2 * | 12/2014 | Seibold | B60N 2/3002 297/316 |
| 2009/0001795 A1 * | 1/2009 | Homier | B60N 2/22 297/340 |
| 2018/0141474 A1 | 5/2018 | Imayou | |

FOREIGN PATENT DOCUMENTS

FR          2999491 A1 *   6/2014   .............. B60N 2/04

OTHER PUBLICATIONS

FR 2999491 Text (Year: 2014).*

* cited by examiner

*Primary Examiner* — Dennis H Pedder
(74) *Attorney, Agent, or Firm* — Barnes & Thornburg LLP

(57) ABSTRACT

An occupant support for a vehicle includes a seat bottom arranged to overlie a floor of the vehicle, a seat back coupled to the seat bottom and arranged to extend upwardly away from the floor, and a seat mode-change system that allows the rear occupant support to adjust the seat bottom and the seat back to provide a storage space.

17 Claims, 6 Drawing Sheets

VEHICLE AND OCCUPANT SUPPORT FOR A VEHICLE

BACKGROUND

Figure 1:
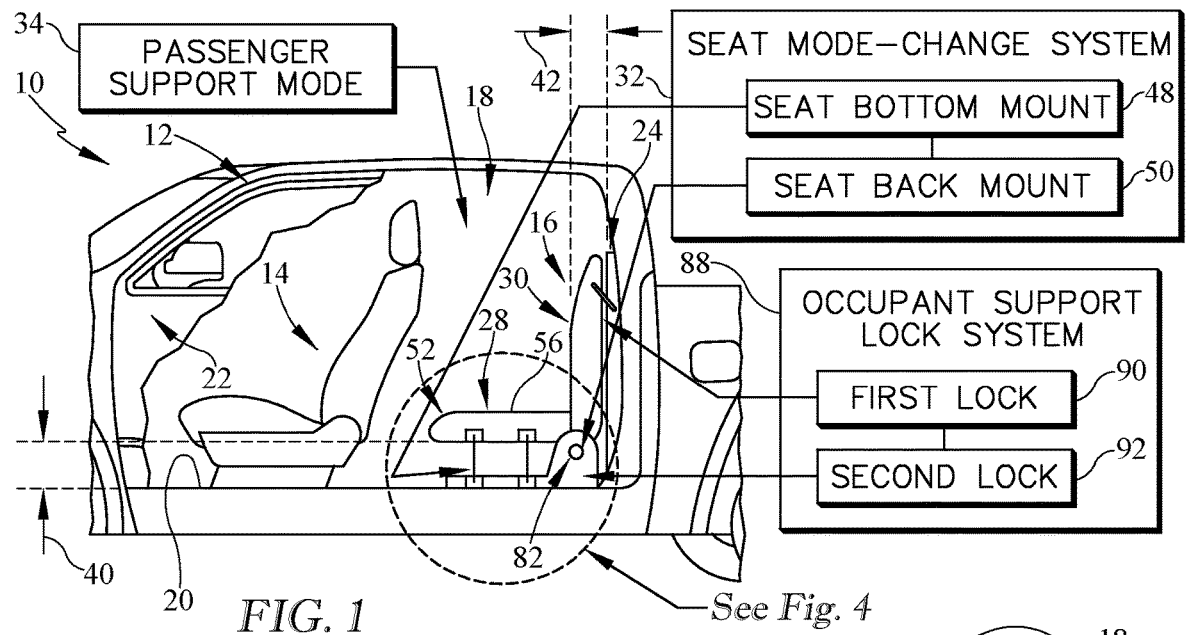

The present disclosure relates to occupant supports, and particularly to rear occupant supports. More particularly, the present disclosure relates to a rear occupant support that is reconfigurable.

SUMMARY

According to the present disclosure, a vehicle includes a vehicle frame, a front occupant support, and a rear occupant support. The vehicle frame defines a passenger compartment and includes a floor and a rear wall. The rear occupant support is reconfigurable relative to the rest of the vehicle to provide one or more storage spaces within the passenger compartment. The rear occupant support includes a seat bottom and a seat back. The seat bottom is normally arranged generally horizontal relative to the floor. The seat back extends upwardly from the seat bottom and the floor to provide a seating surface for an occupant in a passenger support mode.

In illustrative embodiments, the rear occupant support further includes a seat mode-change system configured to allow movement of the rear occupant support relative to the floor and the rear wall between the passenger support mode and a storage mode. In the storage mode, the rear occupant support assumes a flat profile relative to the floor to increase storage space in the rear row of the vehicle between the front occupant support and the rear wall.

In illustrative embodiments, The seat mode-change system includes a seat bottom mount and a seat back mount. The seat bottom mount is coupled to between the floor and the seat bottom and is configured to allow the seat bottom to move relative to the floor. The seat back mount is coupled to the seat back and is configured to allow the seat back to move relative to the rear wall.

In illustrative embodiments, various distances between the seat back and the rear wall and the seat bottom and the floor change when the rear occupant support is adjusted from the passenger support mode to the storage mode. The seat bottom is movable between an upright-seating position and a collapsed-storage position via the seat bottom mount. In the upright seating position, the seat bottom is spaced apart from the floor. In the collapsed-storage position, the seat bottom engages the floor. The seat back is movable between an upright position and a folded-forward position via the seat back mount. In the upright position, the seat back is in confronting relation to the rear wall. In the folded-forward position, the seat back is in confronting relation to the seat bottom.

In illustrative embodiments, the storage mode is configured to provide a storage surface above the floor and between the front occupant support and the rear wall. In the storage mode, the seat bottom engages the floor and the seat back extends substantially horizontally and forward away from the rear wall and is arranged in confronting relation to the seat bottom.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

Figure 2:
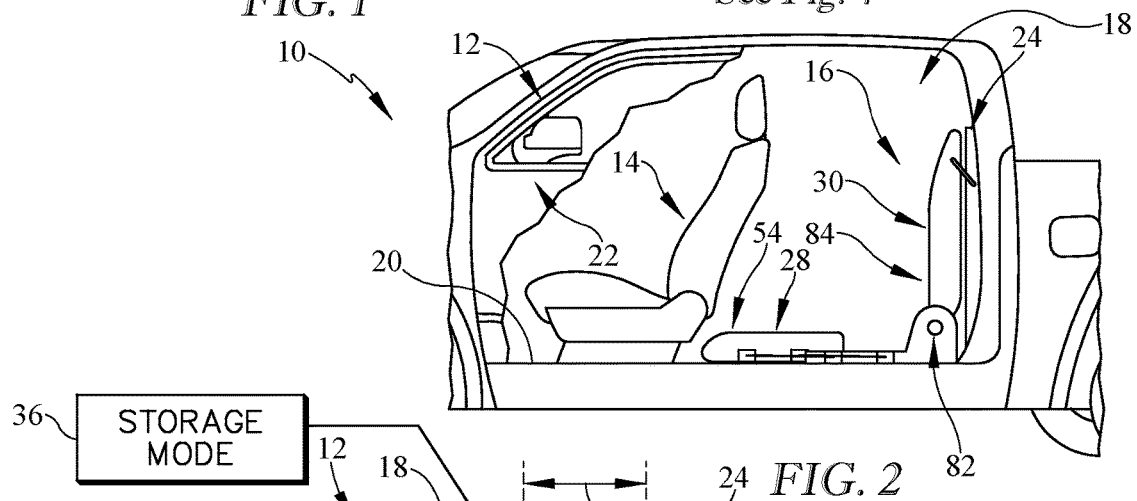
Figure 3:
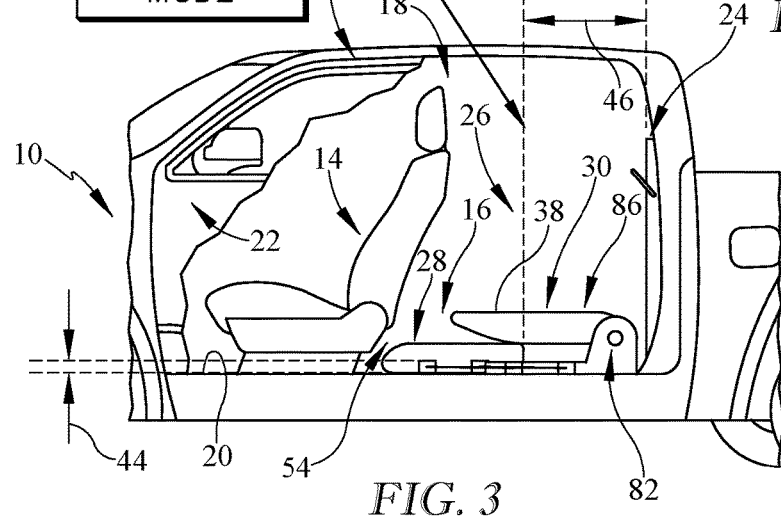
Figure 4:
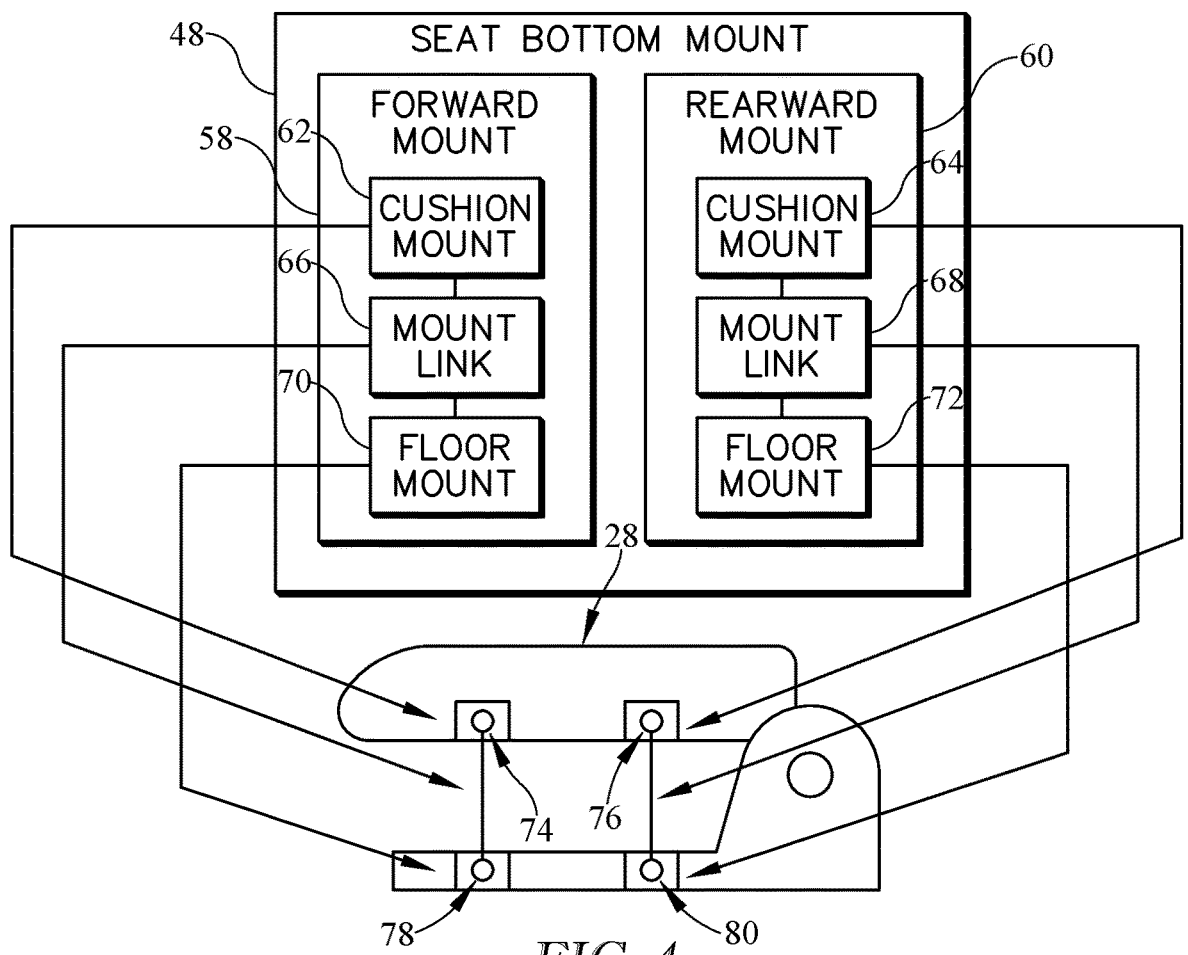
Figure 5:
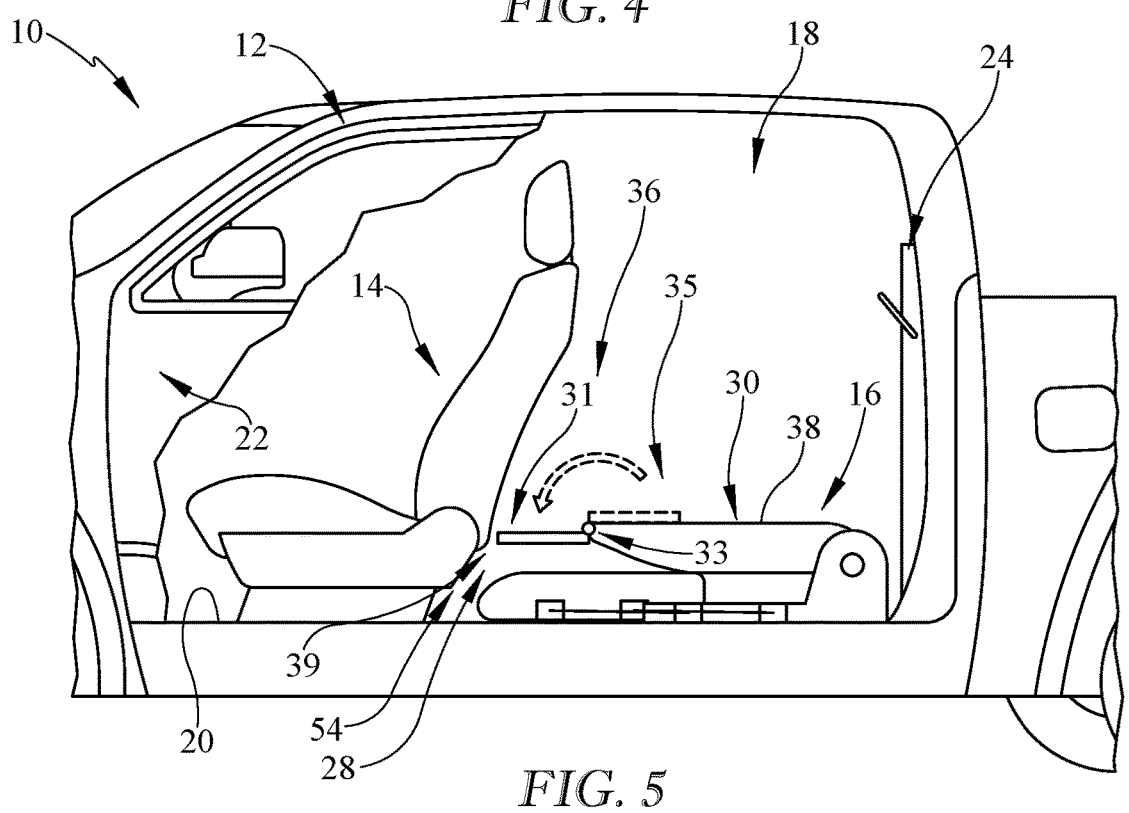
Figure 6:
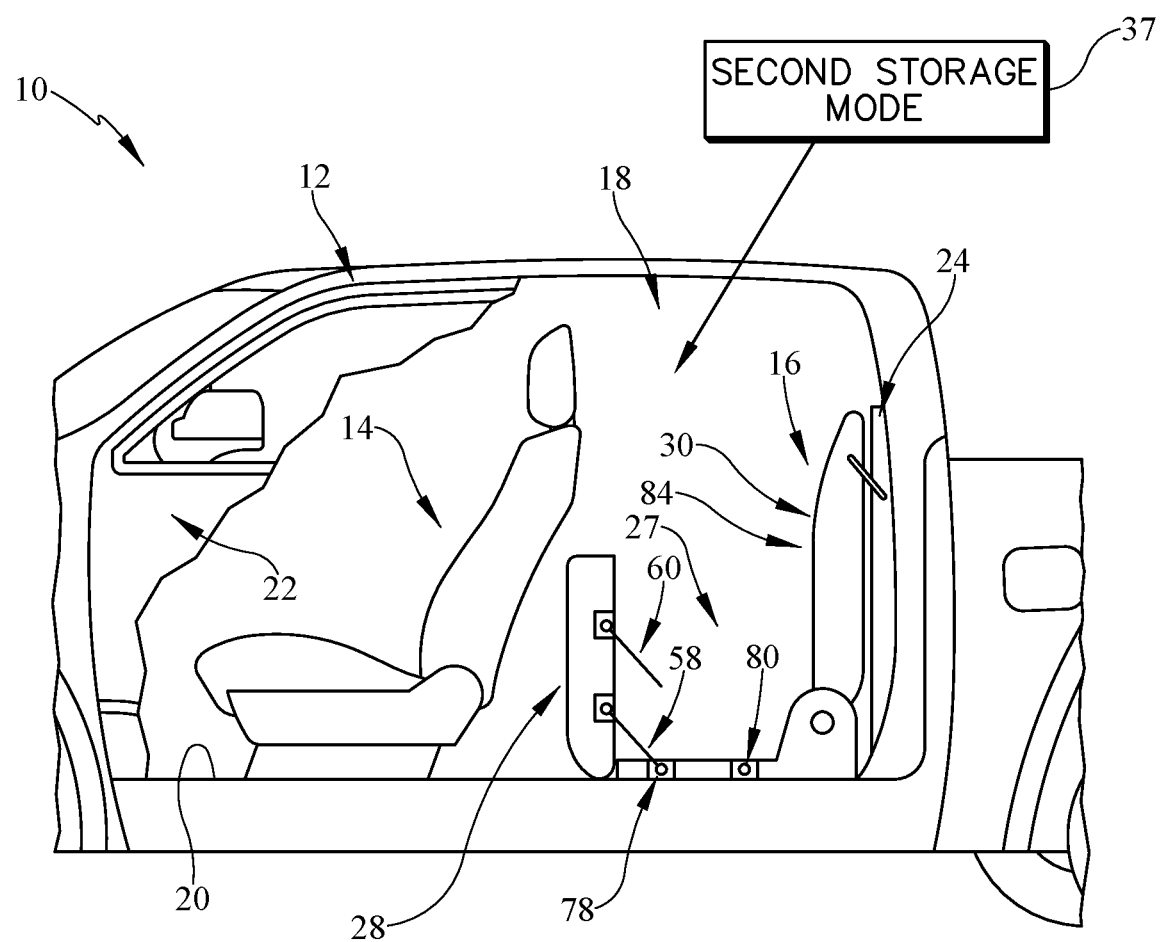
Figure 7:
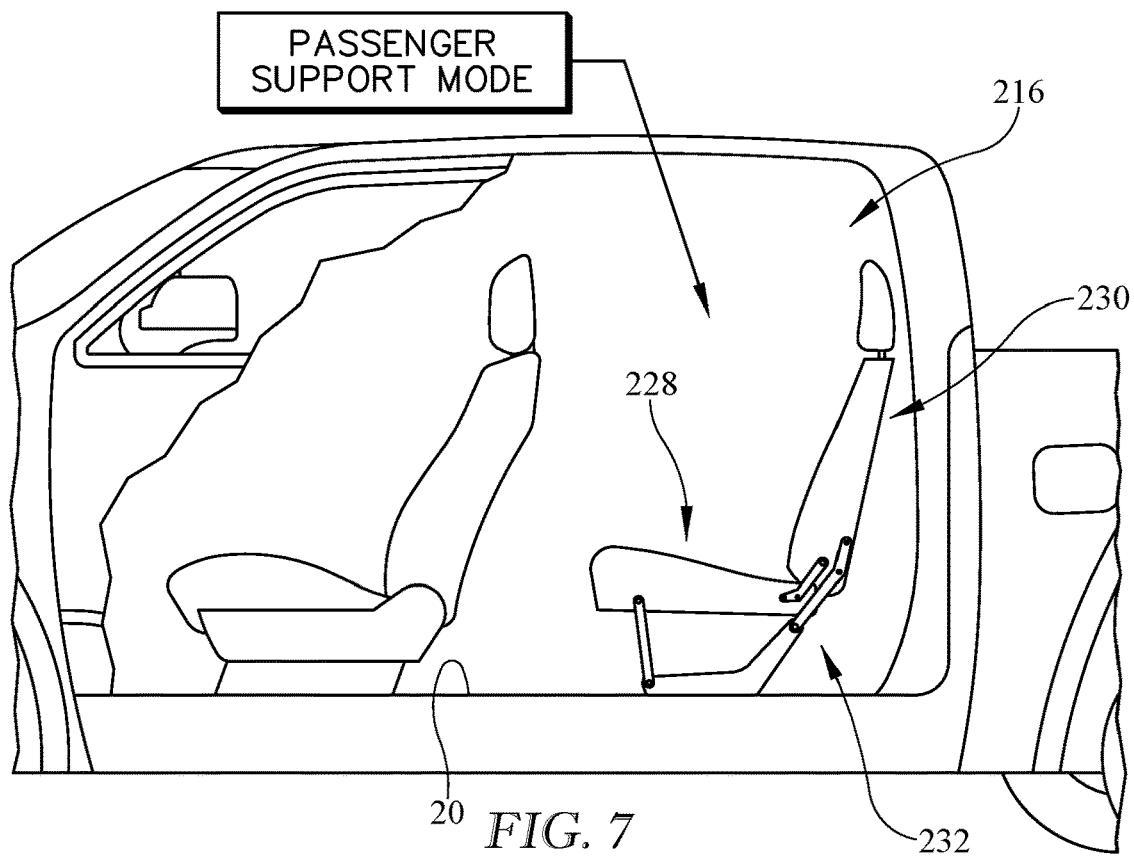
Figure 8:
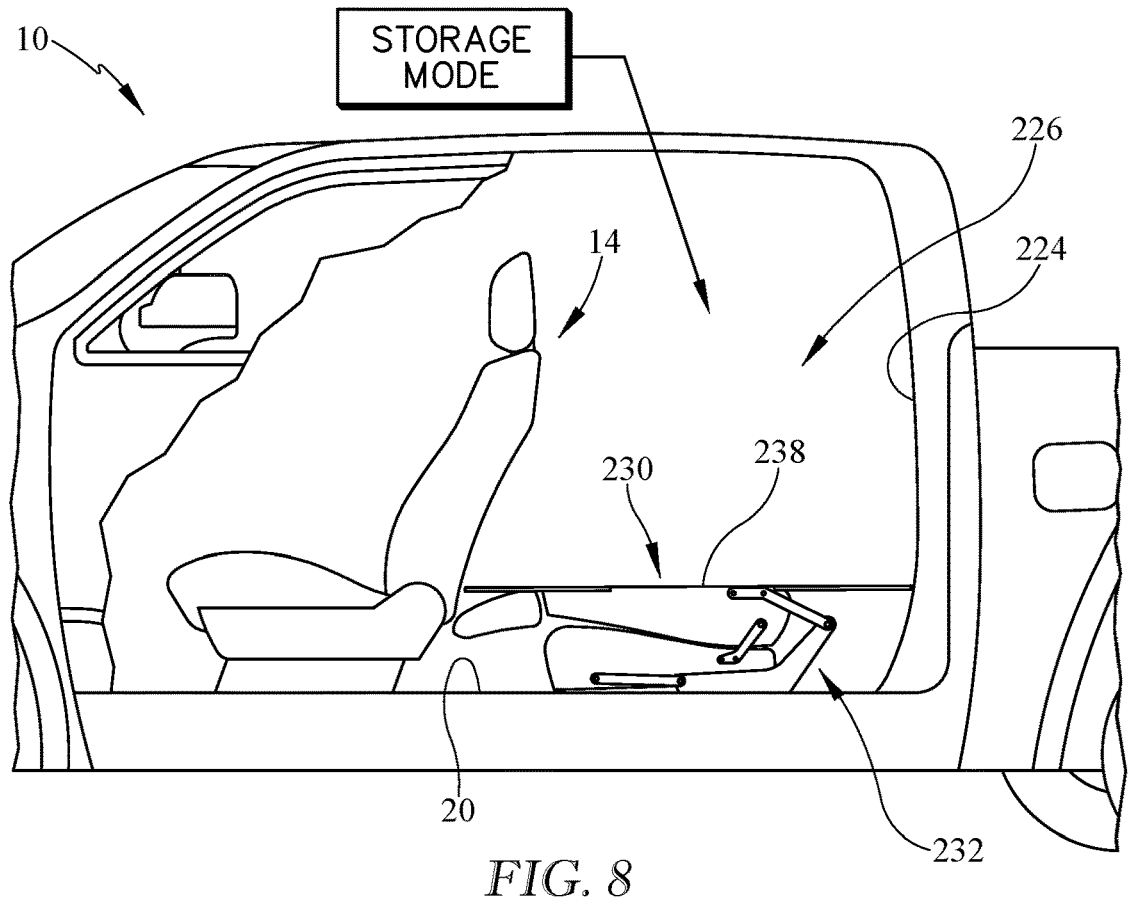
Figure 9:
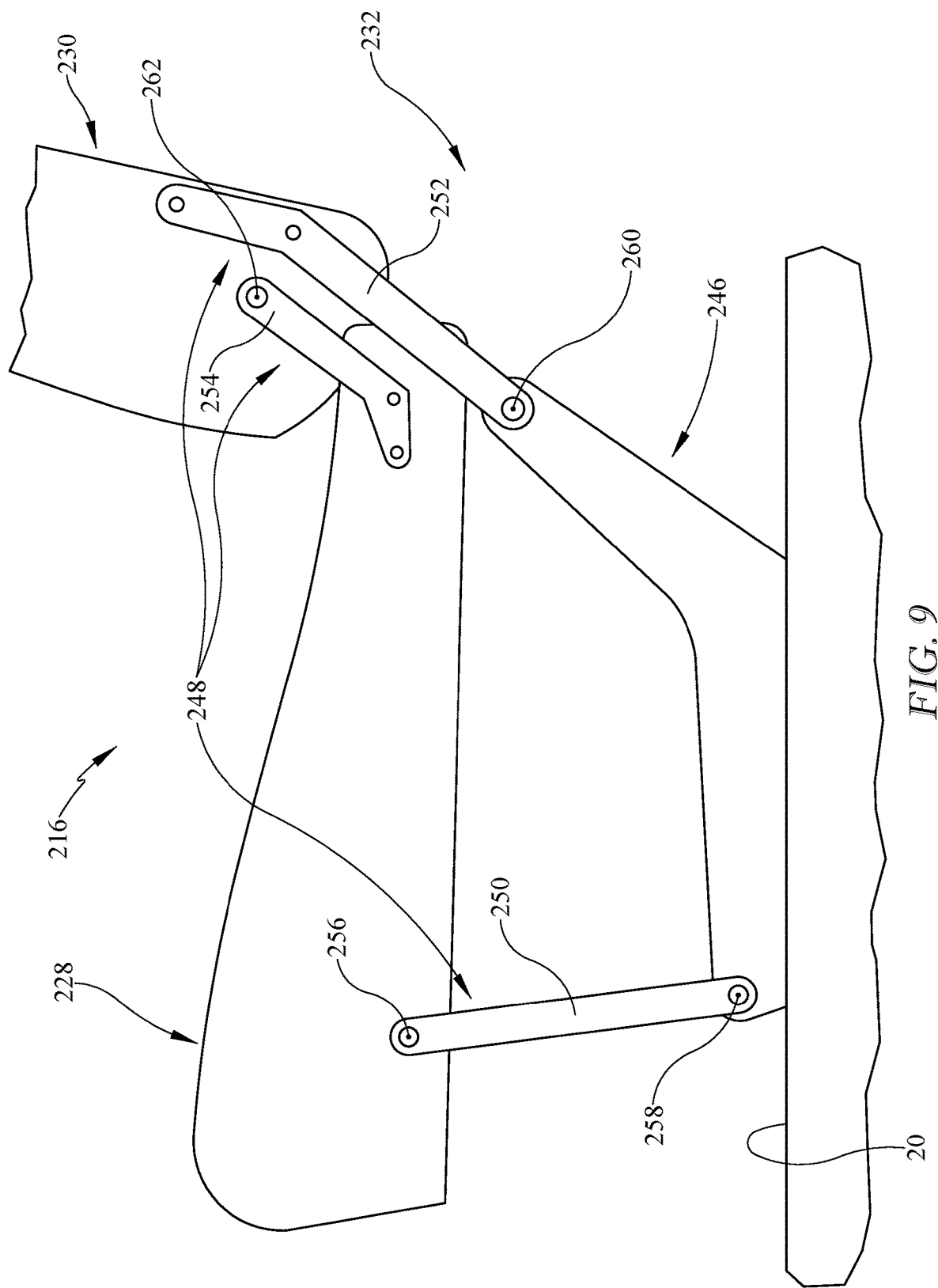
Figure 10:
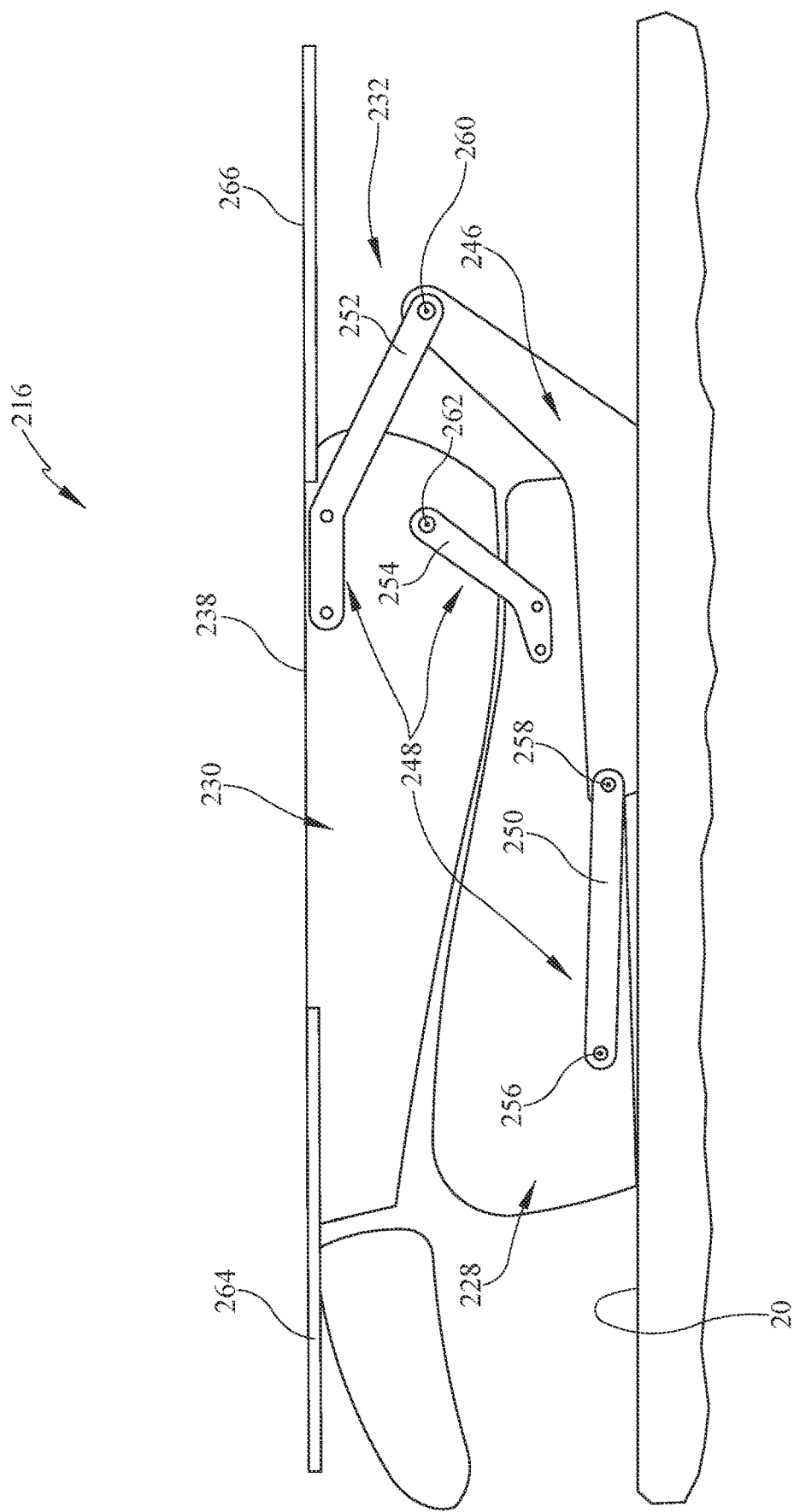

The detailed description particularly refers to the accompanying figures in which:

FIG. 1 is a side elevation and diagrammatic view of a portion of a vehicle with portions cut away to show that the vehicle includes a vehicle frame, a front occupant support, and a rear occupant support including a seat bottom and a seat back that cooperate to provide a seating space for an occupant when the rear occupant support is in a passenger support mode, and showing that the rear occupant support further includes a seat mode-change system that is configured to allow the rear occupant support to change from the passenger support mode to a storage mode, as shown in FIG. 3;

FIG. 2 is a side elevation and diagrammatic view of the portion of the vehicle shown in FIG. 1 showing that the seat mode-change system includes a seat bottom mount coupled between a floor of the vehicle frame and the seat bottom and configured to allow movement of the seat bottom from a seating position, as shown in FIG. 1, to the storage position as shown in FIG. 3;

FIG. 3 is a side elevation and diagrammatic view of the portion of the vehicle shown in FIG. 1 showing the rear occupant support in the storage mode in which the seat bottom engages the floor and the seat back extends substantially horizontally and forward away from a rear wall of the vehicle frame and is arranged in confronting relation to the seat bottom to provide a storage surface above the floor and between the front occupant support and the rear wall;

FIG. 4 is an enlarged portion of FIG. 1 showing that the seat bottom mount includes a forward mount coupled between the floor and a forward end of the seat bottom and a rearward mount coupled between the floor and a rearward end of the seat bottom, and showing that each of the forward mount and the rearward mount include a cushion mount coupled to the seat bottom, a floor mount coupled to the floor, and a mount link that interconnects the cushion mount and the floor mount;

FIG. 5 is a side elevation and diagrammatic view of a portion of the vehicle shown in FIG. 1 showing the rear occupant support in the storage mode and showing that the rear occupant support further includes a deployable storage panel coupled to the seat back for pivotable movement about a panel pivot axis relative to the seat back from a storage position to a deployed position to overlie the seat bottom in the storage mode;

FIG. 6 is a side elevation and diagrammatic view of a portion of the vehicle shown in FIG. 2 showing a portion of the seat bottom mount detached from the floor and the seat bottom rotated forward about a forward floor-mount pivot axis to arrange the seat bottom in confronting relation to the front occupant support and to provide a storage space between the seat bottom and the rear wall;

FIG. 7 is a side elevation and diagrammatic view of a portion of a vehicle including another embodiment of a rear occupant support including a seat bottom and a seat back that cooperate to provide a seating space for an occupant when the rear occupant support is in a passenger support mode, and showing that the rear occupant support further includes a seat mode-change system that is configured to allow the rear occupant support to change from the passenger support mode to a storage mode, as shown in FIG. 8;

FIG. 8 is a side elevation and diagrammatic view of a portion of the vehicle shown in FIG. 7 showing the rear occupant support in the storage mode in which the seat bottom is arranged closer to the floor and the seat back extends substantially horizontally and forward away from a rear wall of the vehicle frame and is arranged in confronting relation to the seat bottom to provide a storage surface above the floor and between the front occupant support and the rear wall;

FIG. 9 is a side elevation view of the rear occupant support from FIG. 7 showing that the seat mode-change system includes a seat foundation coupled to a floor of the vehicle and a seat-motion linkage coupled between the seat foundation and the seat bottom and between the seat foundation and the seat back and configured to control movement of the rear occupant support between the passenger support mode and the storage mode; and FIG. 10 is a side elevation view of the rear occupant support from FIG. 8 showing the rear occupant support folded to the storage mode and showing that the rear occupant support further includes a plurality of deployable panels coupled to the seat back and configured to be pivoted about respective pivot axes to provide a continuous storage surface above the floor of the vehicle.

DETAILED DESCRIPTION

A vehicle 10 in accordance with the present disclosure includes a vehicle frame 12, a front occupant support 14, and a rear occupant support 16, as shown in FIG. 1. The vehicle frame 12 is configured to define a passenger compartment 18 and includes a floor 20, a front dash 22 providing a front boundary of the passenger compartment 18, and a rear wall 24 providing a rear boundary of the passenger compartment 18. The front occupant support 14 is configured to support an occupant of the vehicle 10, for example, and is positioned directly aft of the front dash 22. The rear occupant support 16 is also configured to support an occupant of the vehicle 10 and may be located directly forward of the rear wall 24 to lie between the front occupant support 14 and the rear wall 24. In some embodiments, the front occupant support 14 is first or a second row occupant support and the rear occupant support 16 is a second or third row occupant support. Another embodiment of a rear occupant support 216 used in vehicle 10 is shown in FIGS. 7-10.

The rear occupant support 16 is reconfigurable relative to the rest of the vehicle 10 to provide a storage space 26 within the passenger compartment 18 of the vehicle 10 as shown in FIGS. 1-3. The rear occupant support 16 includes a seat bottom 28, a seat back 30, and a seat mode-change system 32. The seat bottom 28 extends generally horizontally relative to and above the floor 20. The seat back 30 is coupled to the seat bottom 28 and is arranged to extend upwardly away from the floor 20 in front of the rear wall 24. The seat mode-change system 32 is configured to couple the rear occupant support 16 to the floor 20 and allows the seat bottom 28 and the seat back 30 to move relative to the rest of the vehicle 10 to provide the storage space 26 in the passenger compartment 18.

The seat mode-change system 32 is configured to allow movement of the rear occupant support 16 relative to floor 20 and the rear wall 24 between a passenger support mode 34, as shown in FIG. 1, and a storage mode 36, as shown in FIG. 3. The passenger support mode 34 is configured to support an occupant of the vehicle 10, for example. The storage mode 36 is configured to provide a storage surface 38 of the seat back 30 above the floor 20 and between the front occupant support 14 and the rear wall 24 to increase an amount of space available for storing items in the storage space 26. In the passenger support mode 34, the seat bottom 28 is spaced apart from the floor 20 and the seat back 30 is arranged in confronting relation to the rear wall 24. In the storage mode 36, the seat bottom 28 engages the floor 20 and the seat back 30 extends substantially horizontally and forward away from the rear wall 24 and is arranged in confronting relation to the seat bottom 28.

Various distances between the seat back 30 and the rear wall 24 and the seat bottom 28 and the floor 20 change when the rear occupant support 16 is adjusted from the passenger support mode to the storage mode as shown in FIGS. 1-3. The seat bottom 28 is spaced a first distance 40 from the floor 20 in the passenger support mode 34 and a third distance 44 from the floor 20 in the storage mode 36, the first distance 40 being greater than the third distance 44. Likewise, the seat bottom 28 is a second distance 42 from the rear wall 24 in the passenger support mode 34 and a fourth distance 46 from the rear wall 24 in the storage mode 36, the second distance 42 being less than the fourth distance 46. In some embodiments, the third distance 44 is equal to zero such that a lower surface of the seat bottom 28 rests on the floor 20.

The seat mode-change system 32 includes a seat bottom mount 48 and a seat back mount 50 as shown in FIGS. 1-3. The seat bottom mount 48 is coupled between the floor 20 and the seat bottom 28 and is configured to allow the seat bottom 28 to move relative to the floor 20 as the rear occupant support 16 changes from the passenger support mode 34 to the storage mode 36. The seat back mount 50 is coupled to the seat back 30 and is configured to allow the seat back 30 to move relative to the rear wall 24 as the rear occupant support 16 changes from the passenger support mode 34 to the storage mode 36. In some embodiments, the seat back mount 50 may be coupled to the rear wall 24.

The seat bottom mount 48 allows the seat bottom 28 to move from an upright-seating position 52, as shown in FIG. 1, to a collapsed-storage position 54, as shown in FIGS. 2 and 3. In the upright-seating position 52, the seat bottom 28 is spaced apart from the floor 20 and provides a seating surface 56 for an occupant to rest on. In the collapsed-storage position 54, the seat bottom 28 engages the floor 20.

The seat bottom mount 48 includes a forward mount 58 and a rearward mount 60 that secure the seat bottom 28 to the floor 20 as shown in FIG. 4. The forward mount 58 and the rearward mount 60 each include a cushion mount 62, 64 coupled to the seat bottom 28, a floor mount 66, 68 coupled to the floor 20, and a mount link 70, 72 that interconnects the cushion mount 62, 64 and the floor mount 66, 68. In some embodiments, there may be a single mount coupled between the floor 20 and the seat bottom 28. In other embodiments, there may be more than two mounts coupled between the floor 20 and the seat bottom 28.

Each mount link 70, 72 is coupled to the cushion mount 62, 64 for pivotable movement about a cushion-mount pivot axis 74, 76 and to the floor mount 66, 68 for pivotable movement about a floor-mount pivot axis 78, 80 as shown in FIG. 4. Each cushion-mount pivot axis 74, 76 pivots about its corresponding floor-mount pivot axis 78, 80 as the seat bottom 28 moves from the upright-seating position 52 to the collapsed-storage positon 54. The seat bottom 28 may be moved manually by a user about the cushion-mount pivot axes 74, 76 and the floor-mount pivot axes 78, 80, or, in other embodiments, the seat bottom 28 is moved by one or more electric motors in response to user inputs.

The seat back mount 50 is coupled to the seat back 30 and provides a fixed seat-back pivot axis 82 as shown in FIGS. 2 and 3. The seat back 30 is coupled to the seat back mount 50 for pivotable movement about the fixed seat-back pivot axis 82 from an upright position 84, as shown in FIG. 2, to a folded-forward positon 86, as shown in FIG. 3. In the upright positon 84, the seat back 30 is in confronting relation to the rear wall 24 such that a rearward facing surface of the rear occupant support 16 faces toward the rear wall. In the folded-forward position 86, the seat back 30 is in confronting relation to the seat bottom 28 such that a forward facing surface of the seat back 30 faces and engages at least a portion of an upper, seating surface of the seat bottom 28. In some embodiments, the seat back 30 is moved manually by a user about the seat-back pivot axis 82 from the upright position 84 to the folded-forward position 86 and back to the upright position 84. In other embodiments, the movement of the seat back 30 about the seat-back pivot axis 82 is powered by an electric motor in response to user inputs.

The rear occupant support 16 may also include an occupant support lock system 88 configured to block movement of the rear occupant support 16 from the passenger support mode 34 and the storage mode 36, as shown in FIG. 1. The occupant support lock system 88 may include a first lock 90 coupled to the seat back 30 and the rear wall 24 in the passenger support mode 34 and a second lock 92 coupled to the seat bottom 28 in the passenger support mode 34. The first lock 90 is configured to block selectively movement of the seat back 30 relative to the rear wall 24. The second lock 92 is configured to selectively block movement of the seat bottom 28 relative to the floor 20. Each lock 90, 92 may include a first component, such as a latch or hook, that is selectively engageable with a second component, such as a rod, for example. Each lock 90, 92, may be operable manually by a user, via a handle, tether, or button, for example, or, in other embodiments, may be controlled electronically via user input.

The rear occupant support 16 may also include a deployable storage panel 31 configured to move about a panel pivot axis 33 between a storage position 35 and a deployed position 39 as shown in FIG. 5. The deployable storage panel 31 is coupled to the seat back 30 about the panel pivot axis 33. In the storage position 35, the deployable storage panel 31 overlies a portion of the seat back 30 when the rear occupant support 16 is in the storage mode 36. In some embodiments, the deployable storage panel 31 may be removable from the seat back 30 and stored in a compartment in the seat back 30, in the rear wall 24, or elsewhere in the vehicle 10. In the deployed position 39, the deployable storage panel 31 extends forward away from the seat back 30 to extend the storage surface 38 and overlie a portion of the seat bottom 28. In some embodiments, the seat back 30 and the deployable storage panel 31 may cooperate to cover a majority of or all of the seat bottom 28 in the storage mode 36. In other embodiments, the deployable storage panel 31 may be moved manually from the storage positon 35 to the deployed position 39 by a user about the panel pivot axis 33, or, alternatively, the deployable panel storage 31 may be moved by an electric motor in response to user inputs.

In some embodiments, the seat mode-change system 32 is also configured to allow movement of the rear occupant support 16 to a second storage mode 37 as shown in FIG. 6. The second storage mode 37 is configured to provide a rear storage space 27 longitudinally between the seat bottom 28 and the seat back 30.

The seat mode-change system 32 may be configured to allow the rearward mount 60 to detach at the floor-mount pivot axis 80 to move the rear occupant support 16 to the second storage mode 37 as shown in FIG. 6. Once the rearward mount 60 is detached at the floor-mount pivot axis 80, the seat bottom 28 is rotated forward about the floor-mount pivot axis 78 of the forward mount 58 to arrange the seat bottom 28 in confronting relation to the front occupant support 14 and provide the rear storage space 27. In some embodiments, the seat bottom 28 may be detached and moved manually by a user, or, in other embodiments, the seat bottom 28 may be detached and moved by an electric motor in response to user inputs.

Another embodiment of a rear-occupant support 216 that can be included in vehicle 10 is shown in FIGS. 7-10. The rear occupant support 216 is similar to rear occupant support 16 from FIGS. 1-5. Accordingly, similar reference numbers in the 200 series are used to describe similar features between rear occupant supports 16 and 216. The disclosure of rear occupant support 16 is incorporated by reference herein for rear occupant support 216.

The rear occupant support 216 is reconfigurable relative to the rest of the vehicle 10 to provide a storage space 226 within the passenger compartment 18 of the vehicle 10 as shown in FIGS. 7 and 8. The rear occupant support 216 includes a seat bottom 228, a seat back 230, and a seat mode-change system 232. The seat bottom 228 extends generally horizontally relative to and above the floor 20. The seat back 230 is coupled to the seat bottom 228 and is arranged to extend upwardly away from the floor 20 in front of the rear wall 24. The seat mode-change system 232 is configured to couple the rear occupant support 216 to the floor 20 and allows the seat bottom 228 and the seat back 230 to move relative to the rest of the vehicle 10 to provide the storage space 226 in the passenger compartment 18.

The seat mode-change system 232 is configured to allow movement of the rear occupant support 216 relative to floor 20 and the rear wall 24 between a passenger support mode, as shown in FIG. 7, and a storage mode, as shown in FIG. 8. In the passenger support mode, the rear occupant support is configured to support an occupant of the vehicle 10, for example. In the storage mode, the rear occupant support 216 is folded forward and provides a storage surface 238 above the floor 20 and between the front occupant support 14 and the rear wall 24 to increase an amount of space available for storing items in the storage space 226. In the passenger support mode, the seat bottom 228 is spaced apart from the floor 20 and the seat back 230 is arranged in confronting relation to the rear wall 24. In the storage mode, the seat bottom 228 moves closer to the floor 20 and the seat back 230 extends substantially horizontally and forward away from the rear wall 24 and is arranged in confronting relation to the seat bottom 228.

The seat mode-change system 232 includes a seat foundation 246 and a mode-change linkage 248 as shown in FIGS. 7-10. The seat foundation 246 is fixed to the floor 20 of the vehicle 10. The mode-change linkage 248 interconnects the seat foundation 246 and the seat bottom 228 and interconnects the seat foundation 246 and the seat back 230 to mount the seat bottom 228 and the seat back 230 in the vehicle 10. In some embodiments, the seat foundation may be omitted and the seat linkage 248 can be coupled directly to the floor 20 of the vehicle 10.

The mode-change linkage 248 includes a seat bottom mount 250, a seat back mount 252, and a cushion link 254 as shown in FIGS. 7-10. The seat bottom mount 250 interconnects the seat bottom 228 and the seat foundation 246. The seat back mount 252 interconnects the seat back 230 and the seat foundation 246. The cushion link 254 interconnects the seat bottom 228 and the seat back 230. The mode change linkage 248 causes the seat bottom 228 and the seat back 230 to move simultaneously from the passenger support mode to the storage mode upon application of a forward folding force applied to the seat back 230.

The seat bottom mount 250 is mounted to the seat bottom 228 for pivotable movement about a seat bottom pivot axis 256 and is mounted to the seat foundation 246 for pivotable movement about a first foundation pivot axis 258 as shown in FIGS. 7-10. The seat bottom mount 250 is configured to pivot about the seat bottom pivot axis 256 and the first foundation pivot axis 258 to shift the seat bottom forward and downward as the rear occupant support 216 changes from the passenger support mode to the storage mode.

An upper portion of the seat back mount 252 is fixed to the seat back for movement therewith as shown in FIGS. 7-10. The seat back mount 252 is mounted to the seat foundation 246 for pivotable movement about a second foundation pivot axis 260. The seat back 230 pivots about the second foundation pivot axis 260 with the seat back mount 252 and moves downward toward the seat bottom 228 as the rear occupant support 216 changes from the passenger support mode to the storage mode. The upper portion of the seat back mount 252 is angled relative to a lower portion of the seat back mount 252 and is fixed to the seat back 230 in at least two points so that movement of the seat back mount 252 relative to the seat back 230 is blocked.

A lower portion of the cushion link 254 is fixed to the seat bottom 228 for movement therewith as shown in FIGS. 7-10. The cushion link 254 is mounted to the seat back 230 at a second seat back pivot axis 262. The seat back 230 pivots about the second seat back pivot axis 262 as the rear occupant support 216 changes from the passenger support mode to the storage mode. The upper portion of the cushion link 254 is angled relative to a lower portion of the cushion link 254. The lower portion of the cushion link 254 is fixed to the seat bottom 228 in at least two points so that movement of the cushion link 254 relative to the seat bottom 228 is blocked. The seat bottom mount 250, seat back mount 252, and cushion link 254 cooperate to maneuver the seat bottom 228 and the seat back 230 relative to one another as the occupant support 216 changes from the passenger support mode to the storage mode so that the seat back provides the storage surface 238 in spaced-apart relation and substantially parallel to the floor of the vehicle 10 in the storage mode.

The rear occupant support 216 may further include first and second storage panels 264, 266 coupled to the seat back 230 as shown in FIGS. 8 and 10. The storage panels 264, 266 may be pivotable and/or slidable relative to the seat back 230 from undeployed positions to deployed positions to increase an effective width of the storage surface 238 in the storage mode.

The following numbered clauses include embodiments that are contemplated and non-limiting:

Clause 1. A vehicle includes a vehicle frame including a floor, a front dash, and a rear wall to define a passenger compartment between the front dash and the rear wall and above the floor.

Clause 2. The vehicle of clause 1, any other clause, or any suitable combination of clauses, including a front occupant support positioned directly aft of the front dash within the passenger compartment, and Clause 3. The vehicle of clause 2, any other clause, or any suitable combination of clauses, including a rear occupant support positioned between directly forward of the rear wall between the front occupant support and the rear wall within the passenger compartment, the rear occupant support including a seat bottom arranged to overlie the floor, a seat back coupled to the seat bottom and arranged to extend upwardly away from the floor in front of the rear wall, and a seat mode-change system configured to couple the rear occupant support to at least one of the floor and the rear wall, the seat mode-change system including a seat bottom mount coupled between the floor of the vehicle and the seat bottom and a seat back mount coupled to the seat back, Clause 4. The vehicle of clause 3, any other clause, or any suitable combination of clauses, wherein the seat mode-change system is configured to allow movement of the rear occupant support relative to the floor and the rear wall between a passenger support mode, in which the seat bottom is spaced apart from the floor and the seat back is arranged in confronting relation with the rear wall, and a storage mode, in which the seat bottom engages the floor and the seat back extends substantially horizontally and forward away from the rear wall and is arranged in confronting relation to the seat bottom to provide a storage surface above the floor and between the front occupant support and the rear wall.

Clause 5. The vehicle of clause 4, any other clause, or any suitable combination of clauses, wherein in the passenger support mode, the seat bottom is located a first distance from the rear wall and a second distance from the floor, and, in the storage mode, the seat bottom is located a third distance from the rear wall and a fourth distance from the floor, the third distance being greater than the first distance and the fourth distance being less than the second distance.

Clause 6. The vehicle of clause 4, any other clause, or any suitable combination of clauses, wherein the seat back mount is coupled to the seat back so that the seat back is mounted to the seat back mount for pivotable movement about a fixed seat-back pivot axis from an upright position in confronting relation to the rear wall and a folded-forward position in confronting relation with the seat bottom.

Clause 7. The vehicle of clause 6, any other clause, or any suitable combination of clauses, wherein the rear occupant support further includes a deployable storage panel coupled to the seat back for pivotable movement about a panel pivot axis relative to the seat back from a storage position, in which the deployable storage panel is arranged to overlie at least a portion of the seat back in the storage mode, to a deployed position, in which the deployable storage panel extends forward away from the seat back and is arranged to overlie the seat bottom in the storage mode.

Clause 8. The vehicle of clause 7, any other clause, or any suitable combination of clauses, wherein the seat back is arranged to cover a first portion of the seat bottom in the folded-forward position and the deployable storage panel is arranged to cover a second portion of the seat bottom in the deployed position such that the seat back and the deployable storage panel cooperate to cover a majority of the seat bottom in the storage mode.

Clause 9. The vehicle of clause 4, any other clause, or any suitable combination of clauses, wherein the seat bottom mount includes a cushion mount coupled to the seat bottom, a floor mount coupled to the floor, and a mount link that interconnects the cushion mount and the floor mount.

Clause 10. The vehicle of clause 9, any other clause, or any suitable combination of clauses, wherein the mount link is coupled to the cushion mount for pivotable movement about a cushion-mount pivot axis and the mount link is coupled to the floor mount for pivotable movement about a floor-mount pivot axis.

Clause 11. The vehicle of clause 10, any other clause, or any suitable combination of clauses, wherein the cushion-mount pivot axis pivots about the floor-mount pivot axis as the rear occupant support changes from the passenger support mode to the storage mode.

Clause 12. The vehicle of clause 4, any other clause, or any suitable combination of clauses, wherein the seat bottom mount includes a forward mount and a rearward mount, the forward mount and the rearward mount each including a cushion mount coupled to the seat bottom, a floor mount coupled to the floor, and a mount link that interconnects the cushion mount and the floor mount.

Clause 13. The vehicle of clause 4, any other clause, or any suitable combination of clauses, wherein the rear occupant support further includes an occupant-support lock system configured to block movement of the rear occupant support from the passenger support mode to the storage mode, the occupant-support lock system including a first lock coupled to the seat back and the rear wall in the passenger support mode and configured to selectively block movement of the seat back relative to the rear wall and a second lock coupled to the seat bottom in the passenger support mode and configured to selectively block movement of the seat bottom relative to the floor.

Clause 14. A rear row occupant support for a vehicle, the rear occupant support includes a seat bottom arranged to overlie a floor of the vehicle.

Clause 15. The occupant support of clause 14, any other clause, or any suitable combination of clauses, including a seat back coupled to the seat bottom and arranged to extend upwardly away from the floor in front of a rear wall of the vehicle, and Clause 16. The occupant support of clause 15, any other clause, or any suitable combination of clauses, including a seat mode-change system configured to couple the rear occupant support to at least one of the floor and the rear wall of the vehicle, the seat mode-change system including a seat bottom mount coupled between the floor of the vehicle and the seat bottom and a seat back mount coupled to the seat back, Clause 17. The occupant support of clause 16, any other clause, or any suitable combination of clauses, wherein the seat mode-change system is configured to allow movement of the rear occupant support relative to the floor and the rear wall between a passenger support mode, in which the seat bottom is spaced apart from the floor and the seat back extends upwardly away from the floor, and a storage mode, in which the seat bottom engages the floor and the seat back is arranged in confronting relation to the seat bottom to provide a storage surface above the floor.

Clause 18. The occupant support of clause 17, any other clause, or any suitable combination of clauses, wherein in the passenger support mode, the seat bottom is located a first distance from the floor, and, in the storage mode, the seat bottom is located a second distance from the floor less than the first distance.

Clause 19. The occupant support of clause 17, any other clause, or any suitable combination of clauses, wherein the seat back mount allows pivotable movement of the seat back about a fixed seat-back pivot axis from an upright position and a folded-forward position in confronting relation with the seat bottom.

Clause 20. The occupant support of clause 19, any other clause, or any suitable combination of clauses, wherein the rear occupant support further includes a deployable storage panel coupled to the seat back for pivotable movement about a panel pivot axis relative to the seat back from a storage position, in which the deployable storage panel is arranged to overlie at least a portion of the seat back in the storage mode, to a deployed position, in which the deployable storage panel extends forward away from the seat back and is arranged to overlie the seat bottom in the storage mode.

Clause 21. The occupant support of clause 20, any other clause, or any suitable combination of clauses, wherein the seat back is arranged to cover a first portion of the seat bottom in the folded-forward position and the deployable storage panel is arranged to cover a second portion of the seat bottom in the deployed position such that the seat back and the deployable storage panel cooperate to cover a majority of the seat bottom in the storage mode.

Clause 22. The occupant support of clause 17, any other clause, or any suitable combination of clauses, wherein the seat bottom mount includes a cushion mount coupled to the seat bottom, a floor mount coupled to the floor, and a mount link that interconnects the cushion mount and the floor mount.

Clause 23. The occupant support of clause 22, any other clause, or any suitable combination of clauses, wherein the mount link is coupled to the cushion mount for pivotable movement about a cushion-mount pivot axis and the mount link is coupled to the floor mount for pivotable movement about a floor-mount pivot axis.

Clause 24. The occupant support of clause 23, any other clause, or any suitable combination of clauses, wherein the cushion-mount pivot axis pivots about the floor-mount pivot axis as the rear occupant support changes from the passenger support mode to the storage mode.

Clause 25. The occupant support of clause 17, any other clause, or any suitable combination of clauses, wherein the seat bottom mount includes a forward mount and a rearward mount, the forward mount and the rearward mount each including a cushion mount coupled to the seat bottom, a floor mount coupled to the floor, and a mount link that interconnects the cushion mount and the floor mount.

Clause 26. The occupant support of clause 17, any other clause, or any suitable combination of clauses, wherein the rear occupant support further includes an occupant support lock system configured to block movement of the rear occupant support from the passenger support mode to the storage mode.

Clause 27. The occupant support of clause 17, any other clause, or any suitable combination of clauses, wherein the seat mode-change system includes a seat foundation and a mode-change linkage.

Clause 28. The occupant support of clause 27, any other clause, or any suitable combination of clauses, wherein the seat foundation is fixed to the floor of the vehicle and the mode-change linkage interconnects the seat foundation and the seat bottom and interconnects the seat foundation and the seat back to mount the seat bottom and the seat back in the vehicle.

Clause 29. The occupant support of clause 27, any other clause, or any suitable combination of clauses, wherein the seat foundation is omitted and the seat linkage is coupled directly to the floor of the vehicle.

Clause 30. The occupant support of clause 28, any other clause, or any suitable combination of clauses, wherein the mode-change linkage includes a seat bottom mount, a seat back mount, and a cushion link, the seat bottom mount interconnects the seat bottom and the seat foundation, the seat back mount interconnects the seat back and the seat foundation, and the cushion link interconnects the seat bottom and the seat back.

Clause 31. The occupant support of clause 30, any other clause, or any suitable combination of clauses, wherein the mode change linkage causes the seat bottom and the seat back to move simultaneously from the passenger support mode to the storage mode upon application of a forward folding force applied to the seat back.

Clause 32. The occupant support of clause 30, any other clause, or any suitable combination of clauses, wherein the seat bottom mount is mounted to the seat bottom for pivotable movement about a seat bottom pivot axis and is mounted to the seat foundation for pivotable movement about a first foundation pivot axis, the seat bottom mount is configured to pivot about the seat bottom pivot axis and the first foundation pivot axis to shift the seat bottom forward and downward as the rear occupant support changes from the passenger support mode to the storage mode.

Clause 33. The occupant support of clause 30, any other clause, or any suitable combination of clauses, wherein an upper portion of the seat back mount is fixed to the seat back for movement therewith, and the seat back mount is mounted to the seat foundation for pivotable movement about a second foundation pivot axis.

Clause 34. The occupant support of clause 33, any other clause, or any suitable combination of clauses, wherein the seat back pivots about the second foundation pivot axis with the seat back mount and moves downward toward the seat bottom as the rear occupant support changes from the passenger support mode to the storage mode.

Clause 35. The occupant support of clause 34, any other clause, or any suitable combination of clauses, wherein the upper portion of the seat back mount is angled relative to a lower portion of the seat back mount and is fixed to the seat back in at least two points so that movement of the seat back mount relative to the seat back is blocked.

Clause 36. The occupant support of clause 30, any other clause, or any suitable combination of clauses, wherein a lower portion of the cushion link is fixed to the seat bottom for movement therewith and the cushion link is mounted to the seat back at a second seat back pivot axis.

Clause 37. The occupant support of clause 36, any other clause, or any suitable combination of clauses, wherein the seat back pivots about the second seat back pivot axis as the rear occupant support changes from the passenger support mode to the storage mode.

Clause 38. The occupant support of clause 37, any other clause, or any suitable combination of clauses, wherein the upper portion of the cushion link is angled relative to a lower portion of the cushion link and the lower portion of the cushion link is fixed to the seat bottom in at least two points so that movement of the cushion link relative to the seat bottom is blocked.

Clause 39. The occupant support of clause 37, any other clause, or any suitable combination of clauses, wherein the seat bottom mount, seat back mount, and cushion link cooperate to maneuver the seat bottom and the seat back relative to one another as the occupant support changes from the passenger support mode to the storage mode so that the seat back provides the storage surface in spaced-apart relation and substantially parallel to the floor of the vehicle in the storage mode.

Clause 40. The occupant support of clause 30, any other clause, or any suitable combination of clauses, wherein the rear occupant support further includes first and second storage panels coupled to the seat back, and the storage panels are pivotable and/or slidable relative to the seat back from undeployed positions to deployed positions to increase an effective width of the storage surface in the storage mode.

The invention claimed is:

1. A vehicle comprising
a vehicle frame including a floor, a front dash, and a rear wall to define a passenger compartment between the front dash and the rear wall and above the floor,
a front occupant support positioned directly aft of the front dash within the passenger compartment, and
a rear occupant support positioned between directly forward of the rear wall between the front occupant support and the rear wall within the passenger compartment, the rear occupant support including a seat bottom arranged to overlie the floor, a seat back arranged to extend upwardly away from the floor in front of the rear wall, and a seat mode-change system configured to couple the rear occupant support to at least one of the floor and the rear wall, the seat mode-change system including a seat bottom mount coupled between the floor of the vehicle and the seat bottom and a seat back mount coupled to the seat back,
wherein the seat mode-change system is configured to allow movement of the rear occupant support relative to the floor and the rear wall between a passenger support mode, in which the seat bottom is spaced apart from the floor and the seat back is arranged in confronting relation with the rear wall, and a storage mode, in which the seat bottom engages the floor and the seat back extends substantially horizontally and forward away from the rear wall and is arranged in confronting relation to the seat bottom to provide a storage surface above the floor and between the front occupant support and the rear wall,
wherein the seat bottom mount includes a forward mount and a rearward mount, the forward mount and the rearward mount each including a cushion mount coupled to the seat bottom, a floor mount spaced apart from the cushion mount, and a mount link that interconnects the cushion mount and the floor mount, and
wherein the seat back mount is located rearward of the forward mount and the rearward mount in both the passenger support mode and the storage mode and is coupled to the seat back so that the seat back is mounted to the seat back mount for pivotable movement about a fixed seat-back pivot axis relative to the rear wall from an upright position in confronting relation to the rear wall and a folded-forward position in confronting relation with the seat bottom.

2. The vehicle of claim 1, wherein the rear occupant support further includes a deployable storage panel coupled to the seat back for pivotable movement about a panel pivot axis relative to the seat back from a storage position, in which the deployable storage panel is arranged to overlie at least a portion of the seat back in the storage mode, to a deployed position, in which the deployable storage panel extends forward away from the seat back.

3. The vehicle of claim 2, wherein the seat back is arranged to cover a first portion of the seat bottom in the folded-forward position and the deployable storage panel is arranged to cover a second portion of the seat bottom in the deployed position such that the seat back and the deployable storage panel cooperate to cover a majority of the seat bottom in the storage mode.

4. The vehicle of claim 1, wherein the seat bottom mount includes a cushion mount coupled to the seat bottom, a floor mount coupled to the floor, and a mount link that interconnects the cushion mount and the floor mount.

5. The vehicle of claim 4, wherein the mount link is coupled to the cushion mount for pivotable movement about a cushion-mount pivot axis and the mount link is coupled to the floor mount for pivotable movement about a floor-mount pivot axis.

6. The vehicle of claim 5, wherein the cushion-mount pivot axis pivots about the floor-mount pivot axis as the rear occupant support changes from the passenger support mode to the storage mode.

7. The vehicle of claim 1, wherein the rear occupant support further includes an occupant-support lock system configured to block movement of the rear occupant support from the passenger support mode to the storage mode, the occupant-support lock system including a first lock coupled to the seat back and the rear wall in the passenger support mode and configured to selectively block movement of the seat back relative to the rear wall and a second lock coupled to the seat bottom in the passenger support mode and configured to selectively block movement of the seat bottom relative to the floor.

8. A rear row occupant support for a vehicle, the rear occupant support comprising
   a seat bottom arranged to overlie a floor of the vehicle,
   a seat back arranged to extend upwardly away from the floor in front of a rear wall of the vehicle, and
   a seat mode-change system configured to couple the rear occupant support to at least one of the floor and the rear wall of the vehicle, the seat mode-change system including a seat bottom mount coupled between the floor of the vehicle and the seat bottom and a seat back mount coupled to the seat back,
   wherein the seat mode-change system is configured to allow movement of the rear occupant support relative to the floor and the rear wall between a passenger support mode, in which the seat bottom is spaced apart from the floor and the seat back extends upwardly away from the floor, and a storage mode, in which the seat bottom engages the floor and the seat back is arranged in confronting relation to the seat bottom to provide a storage surface above the floor,
   wherein the seat bottom mount includes a forward mount and a rearward mount, the forward mount and the rearward mount each including a cushion mount coupled to the seat bottom, a floor mount spaced apart from the cushion mount, and a mount link that interconnects the cushion mount and the floor mount, and
   wherein the seat back mount is located rearward of the forward mount and the rearward mount and allows pivotable movement of the seat back about a fixed seat-back pivot axis relative to the floor from an upright position extending away from the seat bottom and a folded-forward position in confronting relation with the seat bottom.

9. The occupant support of claim 8, wherein the rear occupant support further includes a deployable storage panel coupled to the seat back for pivotable movement about a panel pivot axis relative to the seat back from a storage position, in which the deployable storage panel is arranged to overlie at least a portion of the seat back in the storage mode, to a deployed position, in which the deployable storage panel extends forward away from the seat back.

10. The occupant support of claim 9, wherein the seat back is arranged to cover a first portion of the seat bottom in the folded-forward position and the deployable storage panel is arranged to cover a second portion of the seat bottom in the deployed position such that-the seat back and the deployable storage panel cooperate to cover a majority of the seat bottom in the storage mode.

11. The occupant support of claim 8, wherein the seat bottom mount includes a cushion mount coupled to the seat bottom, a floor mount coupled to the floor, and a mount link that interconnects the cushion mount and the floor mount.

12. The occupant support of claim 11, wherein the mount link is coupled to the cushion mount for pivotable movement about a cushion-mount pivot axis and the mount link is coupled to the floor mount for pivotable movement about a floor-mount pivot axis.

13. The occupant support of claim 12, wherein the cushion-mount pivot axis pivots about the floor-mount pivot axis as the rear occupant support changes from the passenger support mode to the storage mode.

14. The occupant support of claim 8, wherein the rear occupant support further includes an occupant support lock system configured to block movement of the rear occupant support from the passenger support mode to the storage mode.

15. A rear row occupant support for a vehicle, the rear occupant support comprising
   a seat bottom arranged to overlie a floor of the vehicle,
   a seat back arranged to extend upwardly away from the floor in front of a rear wall of the vehicle, and
   a seat mode-change system configured to couple the rear occupant support to at least one of the floor and the rear wall of the vehicle, the seat mode-change system including a seat bottom mount coupled between the floor of the vehicle and the seat bottom and a seat back mount coupled to the seat back,
   wherein the seat mode-change system is configured to allow movement of the rear occupant support relative to the floor and the rear wall between a passenger support mode, in which the seat bottom is spaced apart from the floor and the seat back extends upwardly away from the floor, a first storage mode, in which the seat bottom engages the floor and the seat back is arranged in confronting relation to the seat bottom to provide a storage surface above the floor, and a second storage mode, in which the seat bottom and the seat back each extend upwardly away from the floor and are parallel to one another and spaced apart from one another to provide a storage space between the seat bottom and the seat back.

16. The occupant support of claim 15, wherein the seat bottom mount includes a forward mount and a rearward mount, the forward mount and the rearward mount each including a cushion mount coupled to the seat bottom, a floor mount, and a mount link that interconnects the cushion mount and the floor mount, and
   wherein rearward mount is configured to detach at the floor mount so that the seat bottom is free to pivot away from the floor mount of the rearward mount to the second storage mode.

17. The occupant support of claim 16, wherein the seat back mount is located rearward of the forward mount and the rearward mount to allow pivotable movement of the seat back about a fixed seat-back pivot axis relative to the seat bottom from an upright position extending away from the seat bottom and a folded-forward position in confronting relation with the seat bottom.

* * * * *